US005558138A

United States Patent [19]

Stock et al.

[11] Patent Number: 5,558,138

[45] Date of Patent: Sep. 24, 1996

[54] PROCESS AND APPARATUS FOR CLEANING CONTAINER HANDLING MACHINES SUCH AS BEVERAGE CAN FILLING MACHINES

[75] Inventors: Klaus-Friedrich Stock, Dortmund; Siegmar Sindermann, Kamen-Heeren, both of Germany

[73] Assignee: KHS Maschinen- und Anlagenbau AG, Dortmund, Germany

[21] Appl. No.: 310,239

[22] Filed: Sep. 21, 1994

[30] Foreign Application Priority Data

Sep. 22, 1993 [DE] Germany .......................... 43 32 202.6

[51] Int. Cl.$^{6}$ ............................... B67C 3/22; B67B 3/00; B65G 47/84

[52] U.S. Cl. .................................. 141/90; 141/1; 141/91

[58] Field of Search ................................ 141/85, 89–91, 141/1; 134/22.18, 25.1, 66, 115 R, 166 R; 53/167

[56] References Cited

U.S. PATENT DOCUMENTS

| | | | |
|---|---|---|---|
| 3,513,024 | 5/1970 | Culliton | 141/91 X |
| 3,788,497 | 1/1974 | Carlson | 414/788.8 |
| 3,964,526 | 6/1976 | Sindermann | 141/90 X |
| 4,527,377 | 7/1985 | Hayashi et al. | 141/91 X |

FOREIGN PATENT DOCUMENTS 2308190 8/1974 Germany .

*Primary Examiner*—J. Casimer Jacyna

*Attorney, Agent, or Firm*—Nils H. Ljungman and Associates

[57] ABSTRACT

Process and apparatus for the cleaning of container handling machines such as beverage can filling machines.

In the beverage industry, it is conventional to subject the container handling machines to an intensive cleaning. For this purpose, the prior art discloses washing containers which, by means of ball catches or other types of connections, are fastened to the individual handling stations or filling valves. This fastening is accomplished either by hand or by placing the washing containers on the support plate for the cans or bottles, whereby the washing containers are moved into the lower portion of the filling mechanism by means of elevating mechanisms.

One disadvantage of this method is that the majority of the work involved in inserting the washing containers must be done manually.

The object of the invention is to achieve an improvement, which is to be seen in the fact that a separate feed device can be moved from outside into contact with the ring gear of the container handling machine, brought together with the ring gear into a transfer position, and the individual washing containers can then be fed to this feed device one after another, and can be moved by this feed device into a locking position and circulated along with the handling stations, and after the completion of the washing process, the washing containers are separated from the handling stations by elements of the feed device, and removed from the ring gear away from the container handling machine.

20 Claims, 12 Drawing Sheets

PROCESS AND APPARATUS FOR CLEANING CONTAINER HANDLING MACHINES SUCH AS BEVERAGE CAN FILLING MACHINES

BACKGROUND OF THE INVENTION

1. Field of the Invention

Process and apparatus for the cleaning of container handling machines such as beverage can filling machines with handling stations, e.g. filling and closing elements, rotating on a ring gear, whereby specially designed washing containers are individually attached to the handling stations to clean them, and are placed in circulation with the container handling machine, and are removed once again after the cleaning of the handling machine, and are removed once again after the cleaning of the handling stations.

2. Background Information

This invention relates to a process for cleaning container handling machines, and to an apparatus suitable for the performance of the process.

In the beverage industry, it is customary to subject the container handling machines to an intensive cleaning before and/or after the handling process. During this operation, all the components which come into contact with the beverage are subjected to a thorough disinfection in the form of a multiple washing with cleaning media. During this process, it is necessary to seal off certain handling stations. In particular on filling and closing machines for bottles, cans etc., an intensive cleaning is also necessary for the area which faces the containers. For this purpose, the prior art discloses washing containers which are fastened to the individual handling stations by means of ball catches or other types of connections. This fastening is accomplished either manually or by placing the washing containers on the base plates of the cans or bottles, and as disclosed in German Laid Open Patent Application No. 23 08 190, the washing containers are moved into the lower portion of the filling mechanism by raising the elevating mechanisms. The washing containers thereby travel along the normal path of the containers to be filled, and are then moved practically toward the filling valves and are held in place against them. To hold them in place, the rotating container handling machine is required to move rather long circumferential distances, and additional control steps are necessary to make it possible to hold the washing containers in place. The machine-specific elevating mechanisms are also essential for such a process. This process of the prior art cannot be used on container handling systems which do not have the appropriate elevating mechanisms.

The prior art also discloses a process in which for each filler valve, there is a separate washing container, and this washing container is continuously transported inside the ring gear. During a specified washing process, this container part is elevated by corresponding devices toward the end surface of the filling mechanism and pressed against it.

One disadvantage of this process is that the washing containers are exposed to the harsh operating conditions which prevail during normal production on the container handling machine, and they become quite dirty. In some cases, they can also contain flakes of broken glass, etc.

Therefore it is not possible to use pre-sterilized washing containers.

OBJECT OF THE INVENTION

The object of the invention is therefore to create a process and corresponding apparatus, by means of which separately sterilized and parked washing containers can be transported to the machine and held in place directly at the tangent point, without the necessity for a large number of control steps, e.g. on the part of the elevating mechanism or the filling elements. In particular, the object of the invention is to be able to automatically insert the washing container automatically in machines which do not include elevating mechanisms and thus do not make provision for the delivery of the washing containers to the respective handling mechanisms.

SUMMARY OF THE INVENTION

The invention teaches that this object can be accomplished by means of the process for cleaning container handling machines with handling stations, e.g. filling and closing elements, rotating on a ring gear, whereby specially designed washing containers are individually attached to the handling stations to clean them, and are placed in circulation with the container handling machine, and are removed once again after the cleaning of the handling stations, and apparatus for the performance of the process.

One advantage of this solution is that in particular, filling machines which have a stationary floor surface for the containers and which make contact with the container only by lowering the filling element, can be automatically provided or equipped with such washing containers in an extremely short time. The washing containers can, for example, be removed from a sterilization bath and placed immediately in the parking position, from which they are then introduced by means of the feed device into the ring gear of the container handling machine, and are immediately held in place in the tangent area. No additional control steps are necessary. The washing containers can also be removed in a simple manner by appropriately connecting the feed device, which then operates as an extraction device with a correspondingly reversed positioning of the cams.

BRIEF DESCRIPTION OF THE DRAWINGS

The invention is explained in greater detail below with reference to the embodiments illustrated in the accompanying drawings.

DESCRIPTION OF THE PREFERRED EMBODIMENT

Figure 1:
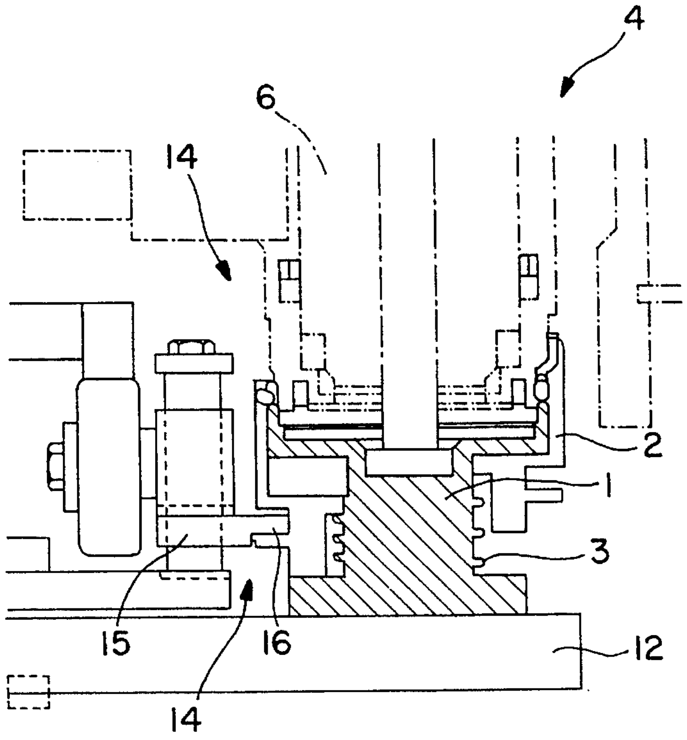
FIG. 1 is a cross section through the washing container and a portion of the feed device.
Figure 2:
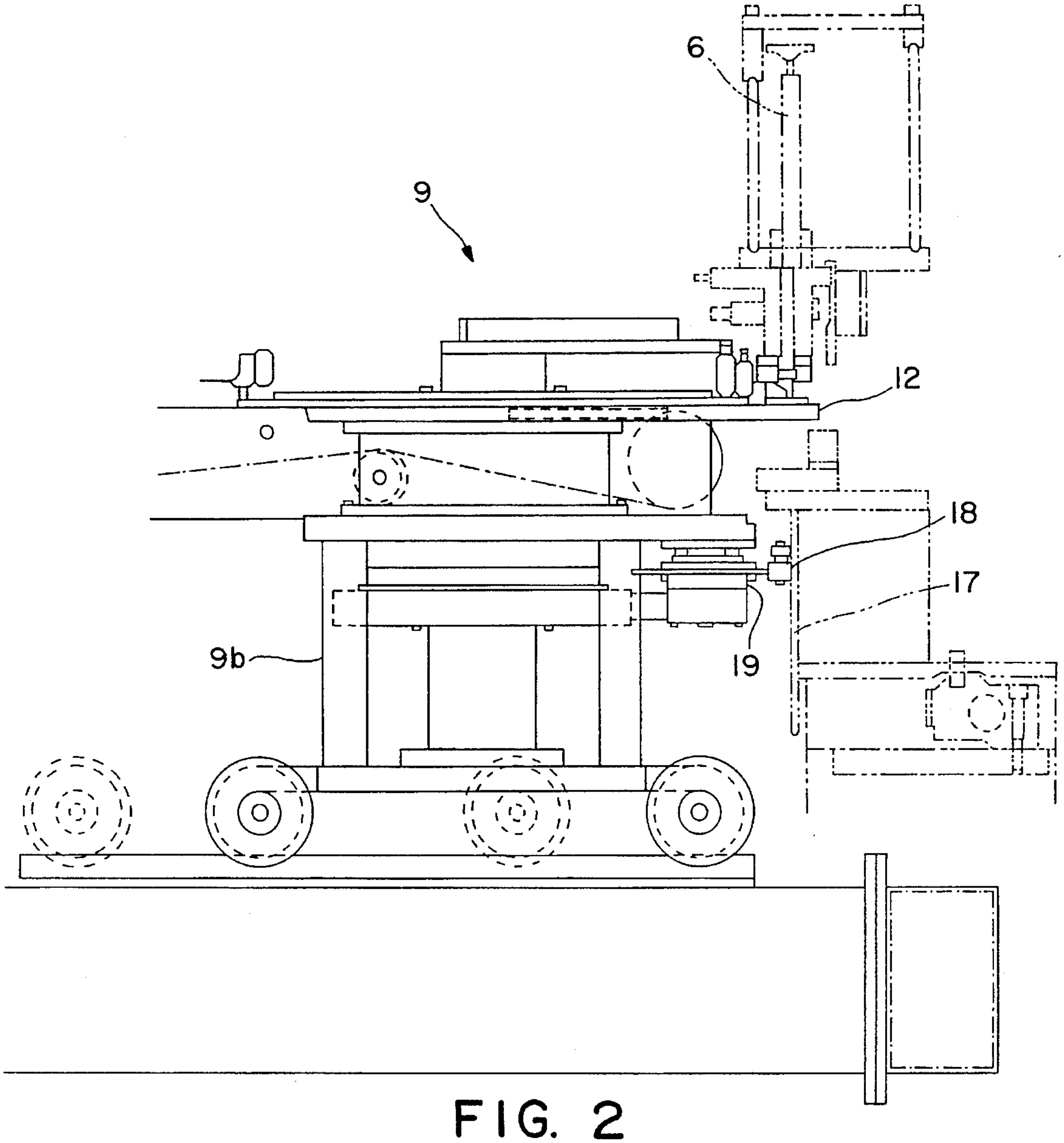
FIG. 2 is a cross section through the complete feed device.
Figure 3:
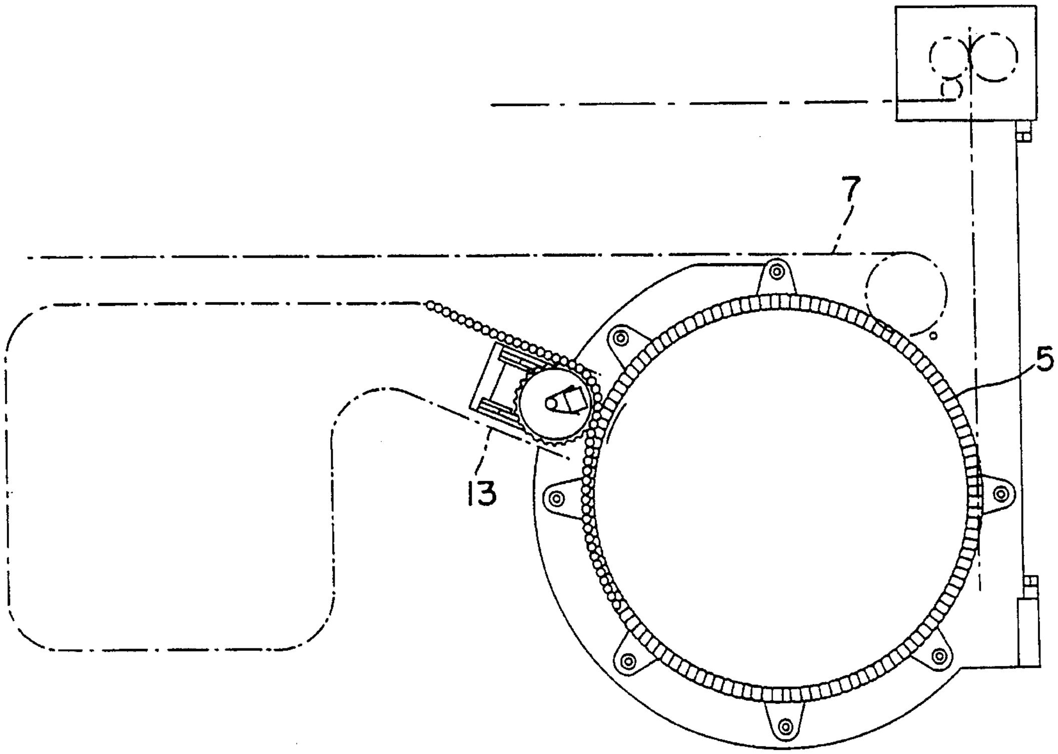
FIG. 3 is an illustration of the feed process.
Figure 4:
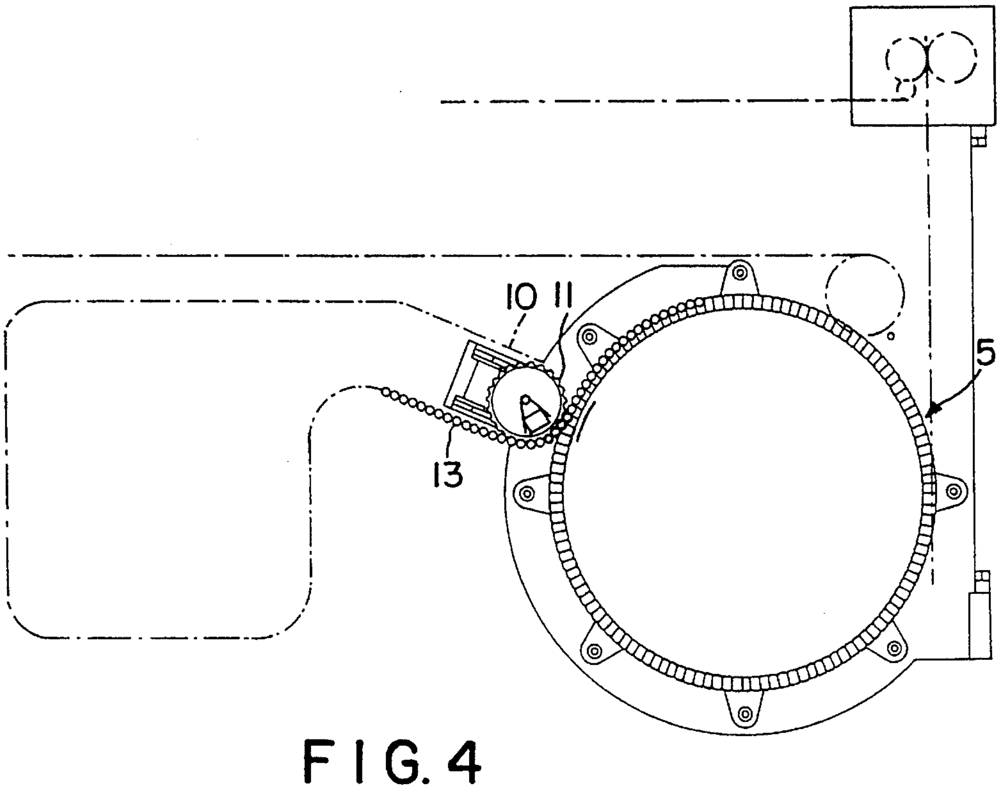
FIG. 4 is an illustration of the removal process, after the completion of the washing process.

In the embodiment illustrated in FIG. 1, the washing container consists of a one-piece or multi-piece structure with a washing housing 1 and the outer housing 2. The two components 1 and 2 are held under prestress by means of a compression spring 3. Such a washing container is introduced to clean the handling stations of container handling machines. The embodiment shows a filling machine for filling cans etc., which are placed in the machine on stationary bases (not illustrated in any great detail), treated and filled, and are then removed from the machine and closed. FIG. 1 shows such a handling station 4, which is located at several locations on the ring gear or platform 5 of the filling and closing machine, in the form of a filler valve 6. Outside the immediate vicinity of the feed conveyor 7 and discharge conveyor 13 (shown in FIG. 3) of the can conveyor, there is a feed device 9 (shown in FIG. 2) which is located at some distance from the ring gear or platform 5 of the filling machine. To connect the washing containers, this feed device 9 can be moved, e.g. in the horizontal plane, toward the ring gear 5 of the filling machine, as shown in FIGS. 2, 3 and 4, and connected to it in a drive connection.

The feed device 9 itself consists of a feed plate conveyor 10 (shown in FIG. 4), a star wheel 11 (shown in FIG. 4) and a slide 12 (shown in FIG. 2) which can be inserted below the plane of motion of the rotating filling valves 6 to support the incoming washing container, and a discharge conveyor 13. Each locator pocket 14 of the star wheel 11 also has a cam-controlled control finger 15 which is engaged in a recess 16 of the washing container which is centered in the star wheel 11 and moves the outer housing 2 against the force of the compression spring 3 into a lower transfer position. FIG. 1 in particular shows that in this position, on account of the normal filling motion process, the filling valve 6 is moved downward during the process of filling the can, and can thereby be introduced into the washing container at the tangent point between the star wheel 11 and the ring gear 5. During the immediately subsequent rotation, both the washing container with the filler valve 6 and also the control finger 15 leave the tangent point, so that the outer housing shoots upward and in this manner a lock is formed between a ball catch connection and the bottom portion of the filler valve 6. The washing container is delivered practically to the area of the ring gear in which the otherwise conventional or normal axially descending motion of the filling valve 6 takes place to create a seal with the can during the filling process. But another descending motion can also be selected. Consequently, separate control devices to connect the washing container become unnecessary, as do special elevating devices to lift the washing container into a locked position.

Another embodiment of the invention could be used to clean bottling or other machines in the beverage and food industries. In filling machines there are many handling stations 4 disposed around the periphery of the ring gear or platform 5 which handling station 4 fills the cans being fed onto the ring gear or platform 5. As stated above, the feed device 9 is shown in FIG. 5*a* in a position of readiness for engagement to the ring gear 5.

Figure 1A:
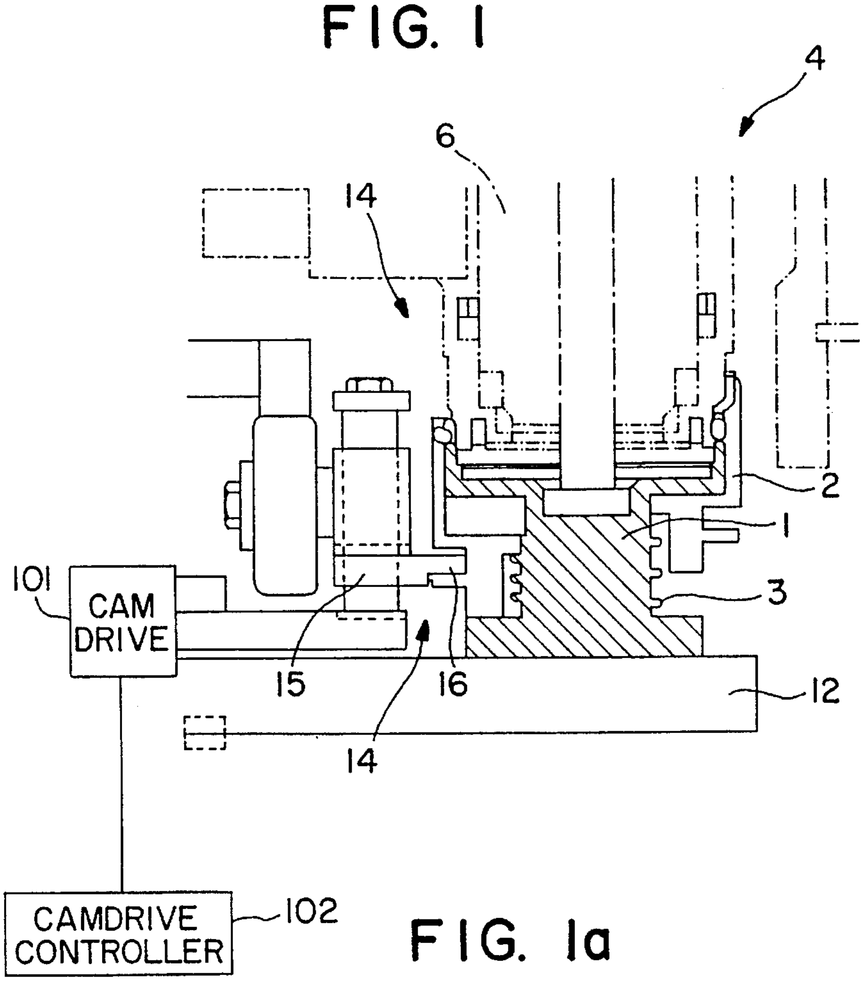
FIG. 1*a* is a cross section through the washing container and a portion of the feed device with a cam drive.

FIG. 1*a* is substantially the same view as FIG. 1, but additionally illustrates a cam drive 101 and cam drive controller 102 which may be used, in a known manner, in accordance with the present invention.

As shown in FIG. 4, the feed device 9 itself consists or comprises a feed plate conveyor 10, a star wheel 11 and a slide 12 (shown in FIG. 2) which slide 12 can be inserted below the plane of motion of the rotating filling valves 6 to support the incoming washing container, and in addition the feed device comprises a discharge conveyor 13. As shown in FIG. 1, each locator pocket 14 of the star wheel 11 also has a cam-controlled control finger 15 which is engaged in a recess 16 of the washing container which is centered in the star wheel 11 and moves the outer housing 2 against the force of the compression spring 3 into a preferably lower transfer position. FIG. 1 in particular shows that in this position, on account of the normal filling motion process, the filling valve 6 is moved downward during the process of filling the can, and can thereby be introduced into the washing container at the tangent point between the star wheel 11 and the ring gear or platform 5. During the immediately subsequent rotation, both the washing container with filler valve 6 and also the control finger 15 leave the tangent point, so that the outer housing 2 shoots upward, preferably by action of the spring 3, and in this manner a lock is formed between a ball catch connection and the bottom portion of the filler valve, 6. The washing container is usually delivered practically to the area of the ring gear or platform 5 in which the otherwise conventional axially descending motion of the filling valve 6 takes place to create a seal with the can during the filling process and such an occurrence may happen during the present operation. But another descending motion can also be selected in an alternate embodiment of the invention. Consequently, at least in the alternative embodiment, separate control devices to connect the washing container may become unnecessary, as possibly do or do special elevating devices to lift the washing container into a locked position.

As shown in the embodiment illustrated in FIG. 3, the cam 16 (shown in FIG. 1) actuates the control finger 15 (shown in FIG. 1) and thus lowers the outer housing 2 of the washing container in the input or feed position.

Figure 3A:
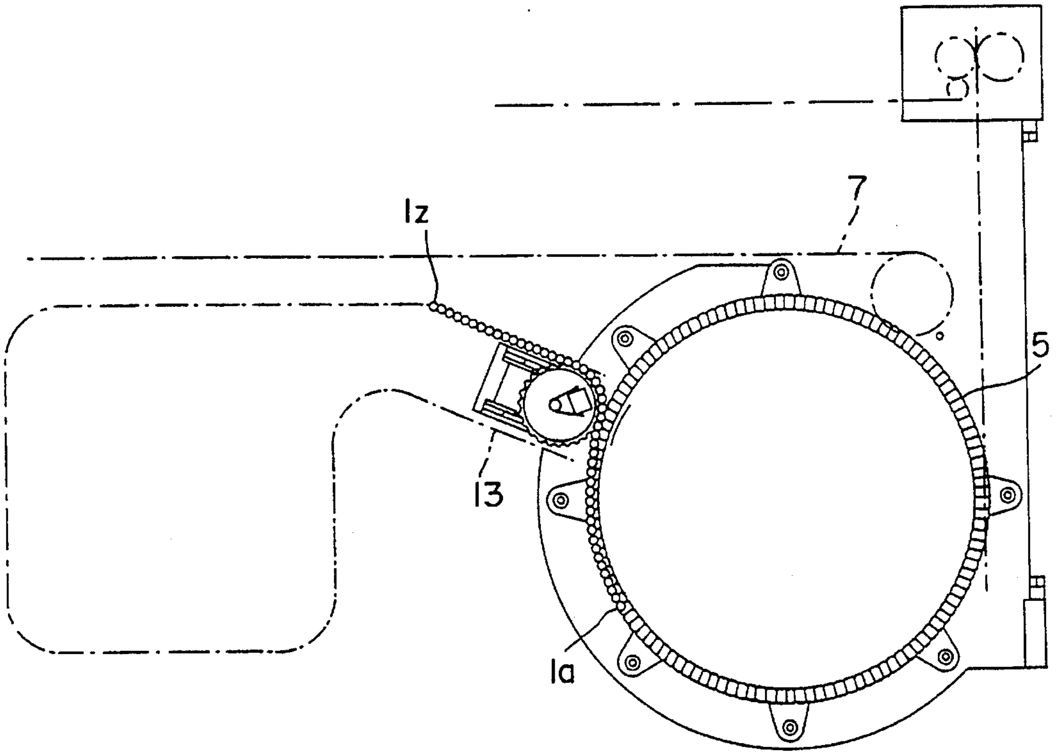
FIG. 3*a* is a further of the feed process of FIG. 3.
Figure 4A:
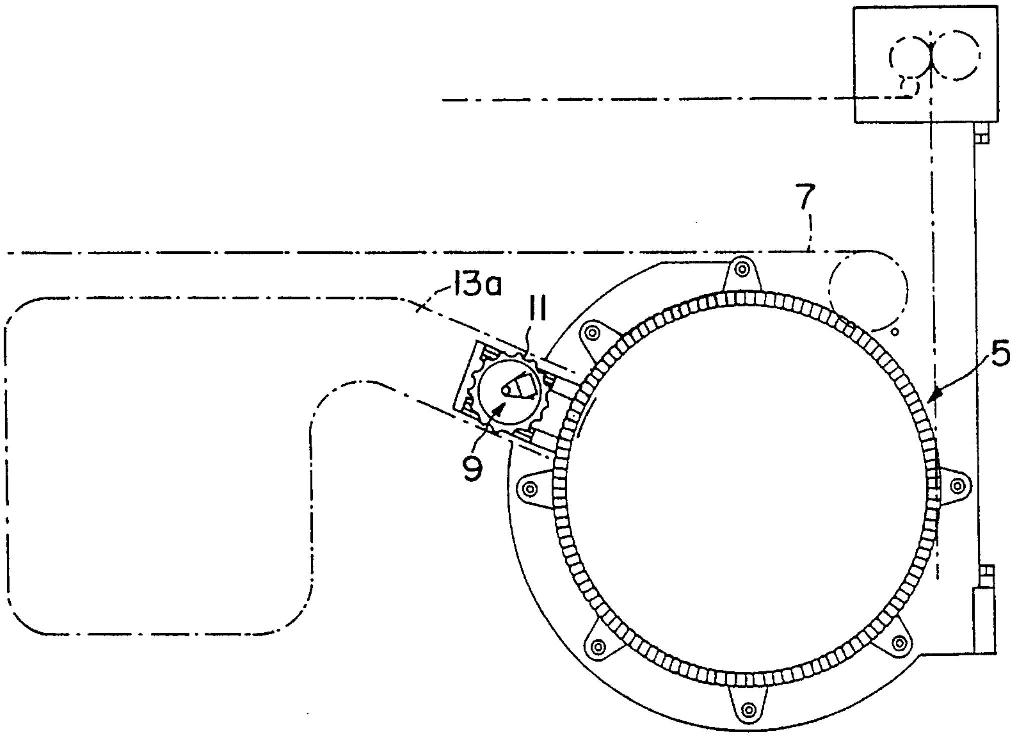
FIG. 4*a* shows the cleaning machine adjacent the bottle or can filling machine.
Figure 4B:
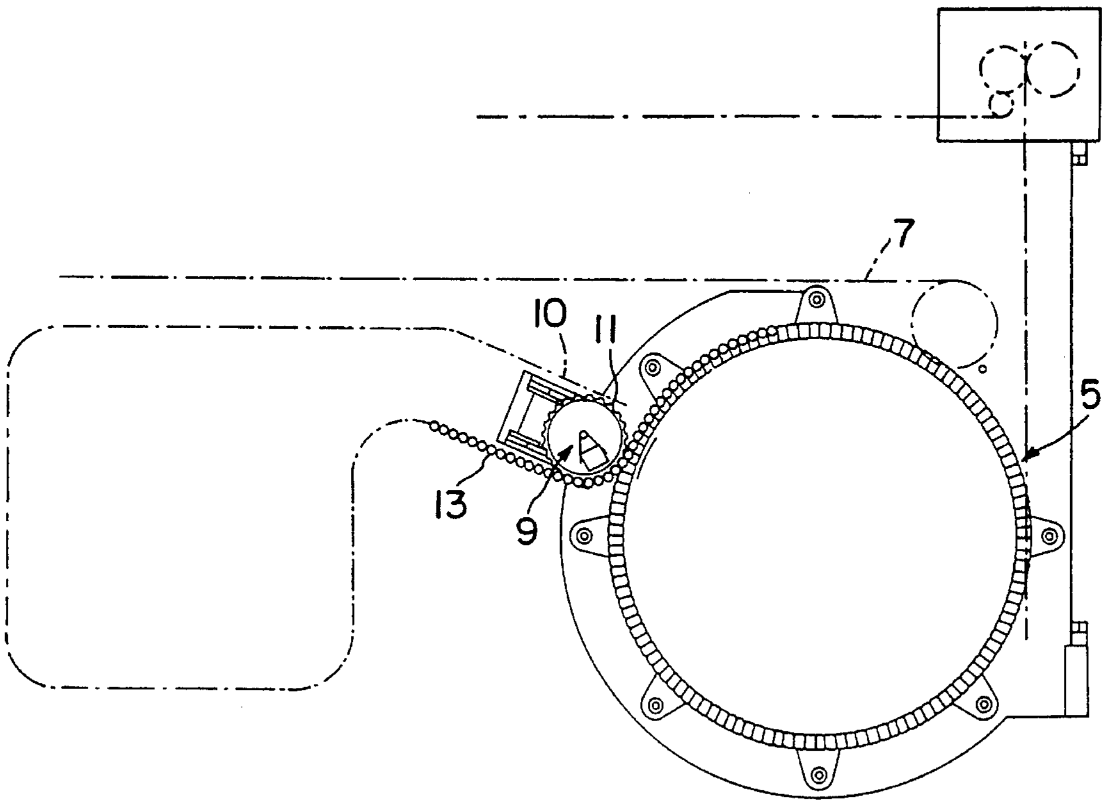
FIG. 4*b* is a further illustration of the removal process, after the completion of the washing process.

FIG. 3*a* shows the containers 1*a* to 1*z* extending from container 1*a*, so that is the first container being loaded into the ring gear or platform 5, to container 1*z* still on the conveyor 13*a* (shown in FIG. 4*a*). The cam 16 is controlled in a feeding step, feeding the containers 1*a* to 1*z* into the ring gear or platform 5, such that the control finger 15 feeds the containers 1*a* to 1*z* into the; ring gear or platform 5. As in the embodiment illustrated in FIG. 4, this cam 16 can be adjusted accordingly for the extraction process, so that the sequence of events of the extraction of the individual washing containers and the unlocking process can occur in the reverse order.

In the embodiment illustrated in FIG. 2, the feed device 9 is a car which can be moved mechanically, pneumatically or electrically in the horizontal plane, the respective positions of which can be controlled either manually or by means of control cylinders. But it is also conceivable that this embodiment can be designed so that the feed takes place in different planes, which can involve pivoting, elevation, etc.

Figure 2A:
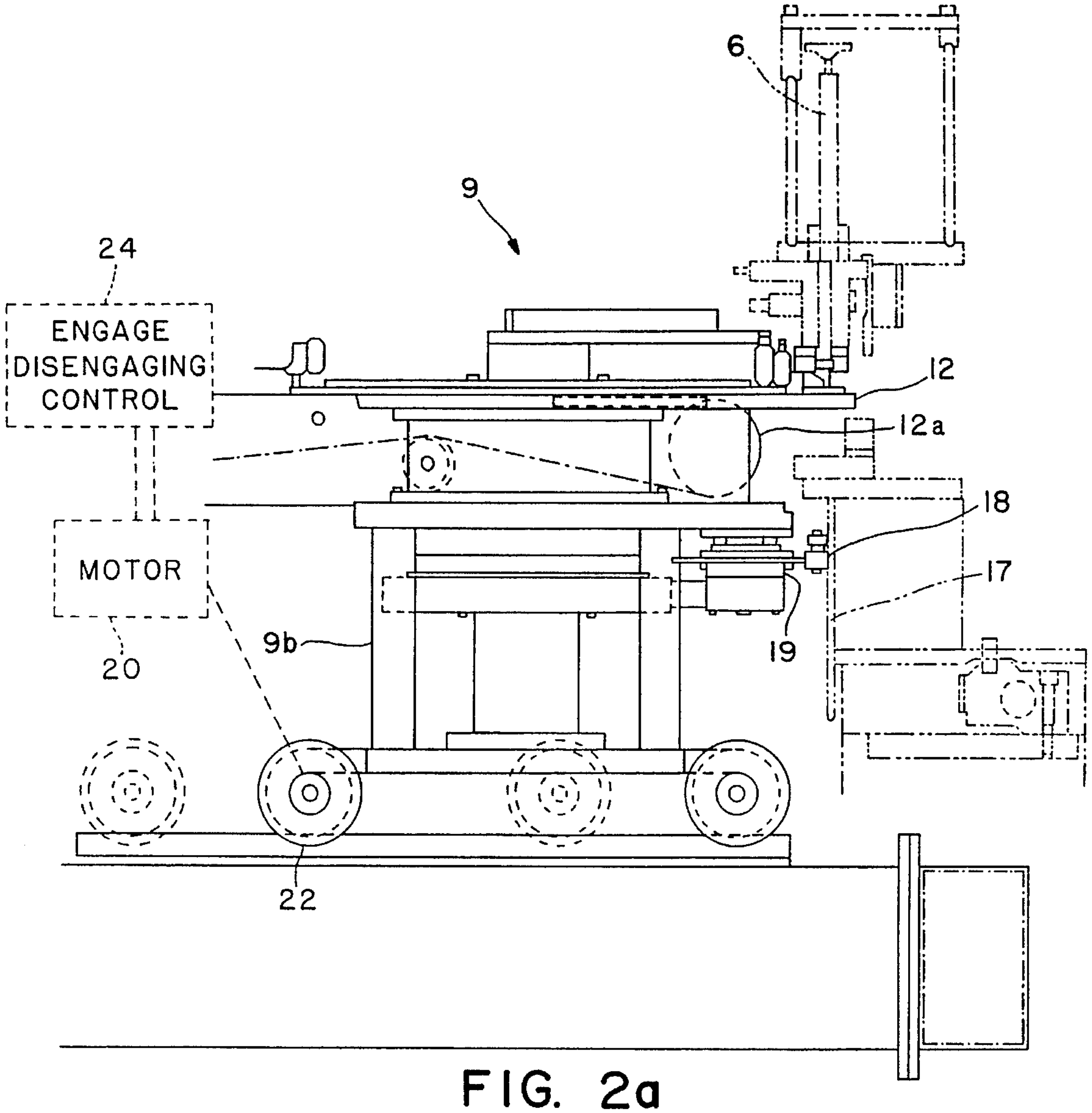
FIG. 2*a* is a further embodiment of FIG. 2 including the motor and engage-disengaging control.

As shown in FIG. 2*a* a motor 20 is engaged to wheels 22. The motor 20 is controlled by engage-disengage control 24 which includes a switch 1.

As FIG. 2 also shows, to drive the star wheel 11 of the feed device 9, a roller element 18 is applied against the outer shell 17 of the ring gear 5 of the filling machine, and is engaged in a drive star wheel 19 of the feed device 9, and in this manner directly drives the star wheel 11 of the feed device 9, without the need for additional synchronization means such as a separate drive.

In one embodiment of the present invention, the star wheel 11 and the ring gear 5 are aligned manually to permit the containers to pass between the star wheel 11 and the ring gear 5 in synchronism.

Following the end of the washing process and the removal of the washing containers from the handling stations or filling valves 6, the entire feed device 9 is moved outside the ring gear 5 and is held in the parked position. While in this position, the washing containers can be disinfected, and they can then be reintroduced to the individual handling stations from the respective parking belt and the feed device 9 for a repeated cleaning of the container handling machine. The washing containers 1 are preferably removed and placed in a sterilizing apparatus to disinfect them.

Figure 5:
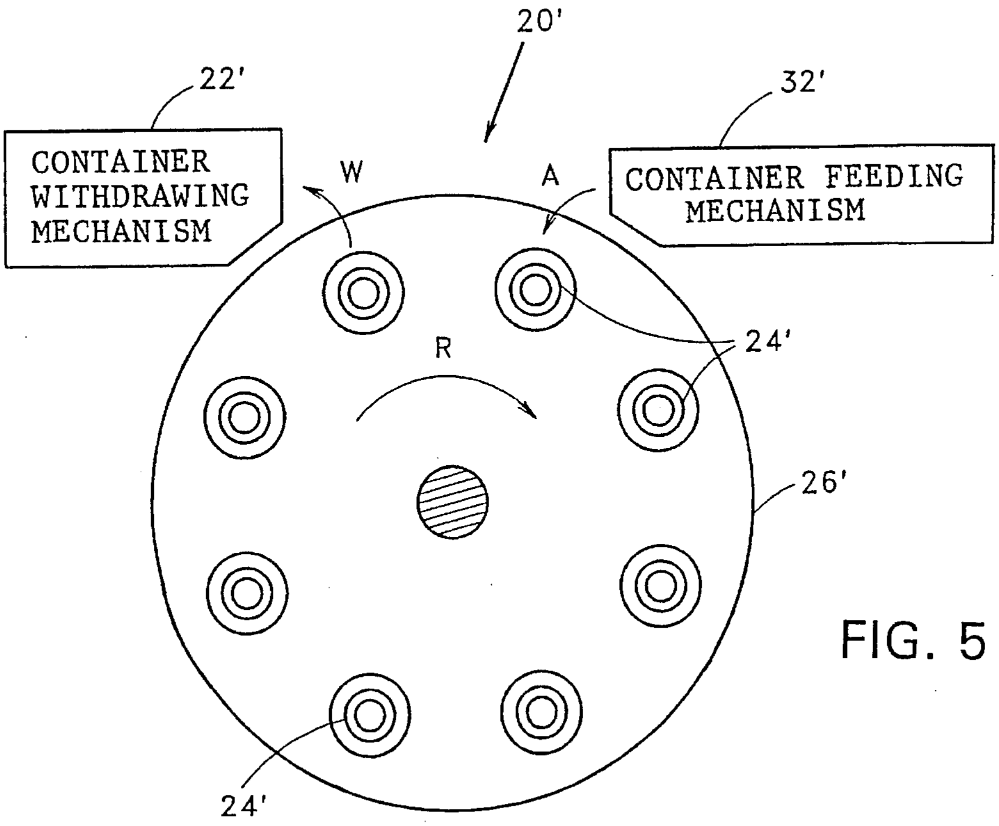
FIG. 5 shows a schematic top view of a machine including various features of the invention including separate feeding and withdrawing mechanisms.
Figure 5A:
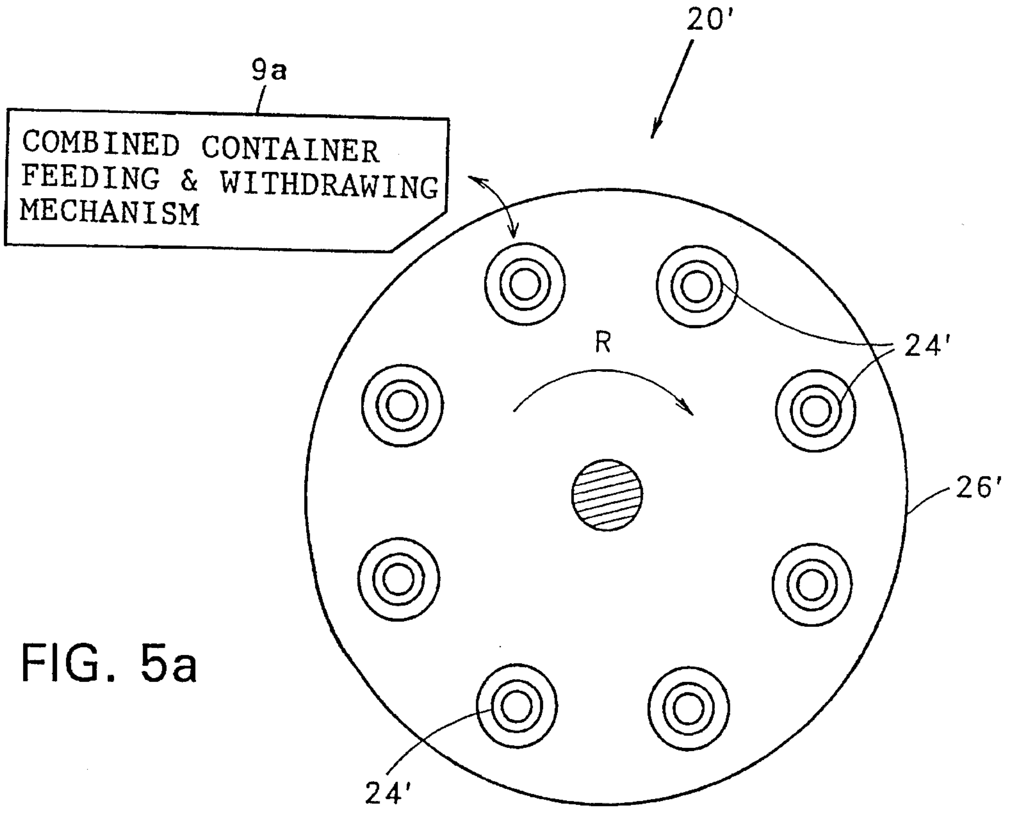
FIG. 5*a* shows a schematic top view of a machine including various features of the invention including a combined feeding and withdrawing mechanism.

In FIG. 5, a bottling or can filling machine 20' is shown in schematic form. In an alternative embodiment of the invention there can be a container feeding mechanism 32' for advancing the containers 24' as indicated by the arrow A. The containers 24' are sequentially positioned by the container feeding mechanism 32' on a revolving bottle support platform or ring gear 26' for advancement in a direction as indicated by the arrow R. After the bottling machine 20' is cleaned, continued rotation of the platform or ring gear 26' in the direction R advances containers 24 to a container withdrawing mechanism 22' for removal of the containers 24' from the revolving platform or ring gear 26' as indicated by the arrow W. In FIG. 5 only a small number of container positions are shown on the ring gear 26'.

FIG. **5*a* shows another embodiment of a bottling or can filling machine 20' similiar to that of FIG. 5 with a single container withdrawing and feeding mechanism 22*a* which feeds and then withdraws containers 24' from the ring gear or platform 26'**.

Figure 6:
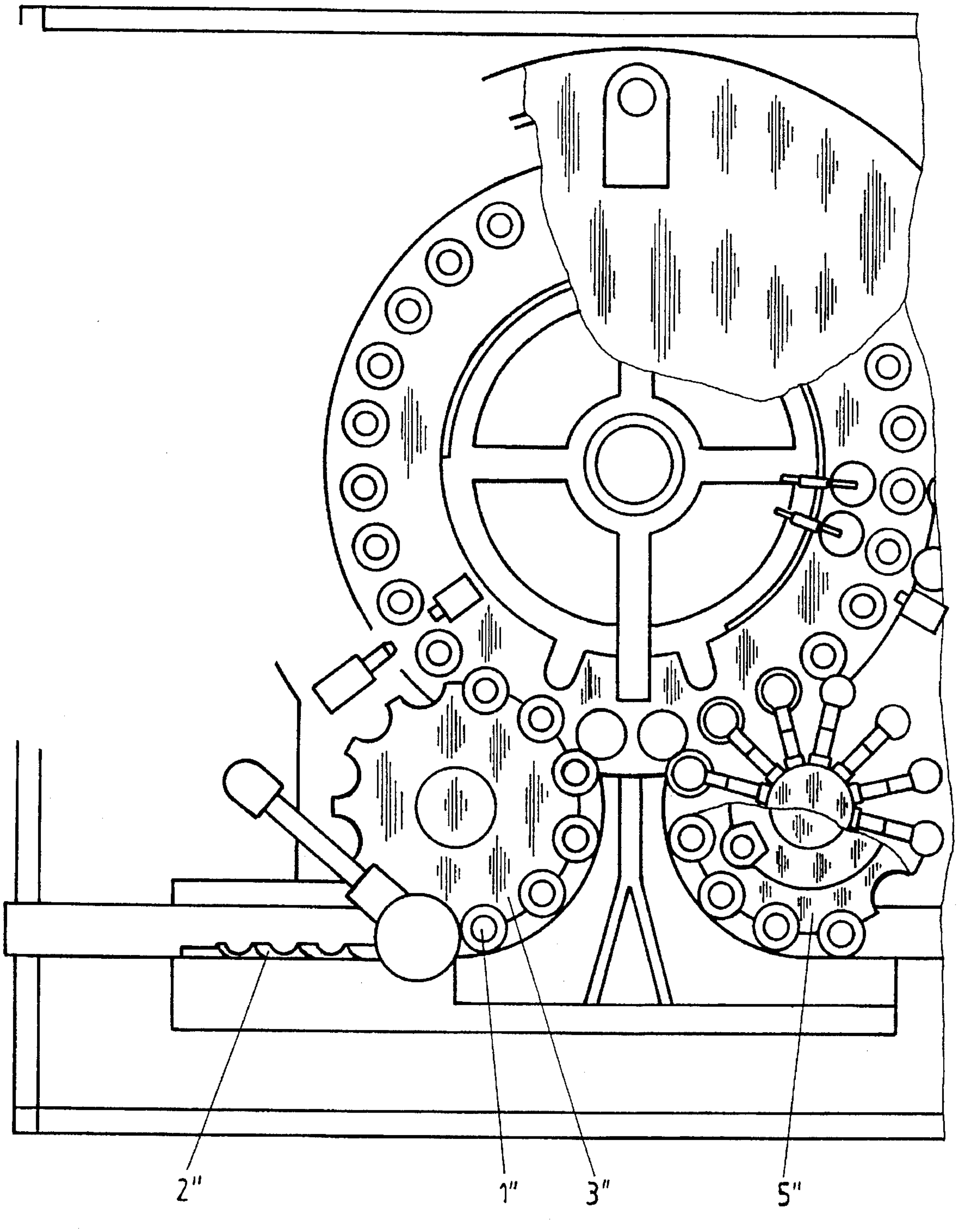
FIG. 6 shows a schematic plan view of a container filling machine.

An example of an alternative embodiment of a container feeding and withdrawing mechanism analogous to the star wheel 11 of FIG. 4 is illustrated in FIG. 6 which has feed conveyor 2"for transport of the containers 1", an inlet star wheel 3" for moving the containers from the feed conveyor 2", a turntable starwheel 4" for carrying the containers on the bottling machine, and an outlet star wheel 5" for removing the containers from the machine to another feed conveyor (not shown). These parts, 2" through 4", are synchronously driven and have receptacles thereon for receipt of the containers, so that a container 1" entering the feed conveyor 2" can be tracked with regard to its position during its transport throughout the bottling machine. The mechanism of FIG. 6 can be mounted to wagon **9*b* of FIG. 2*a* to replace the star wheel FIG. 4**.

Figure 7:
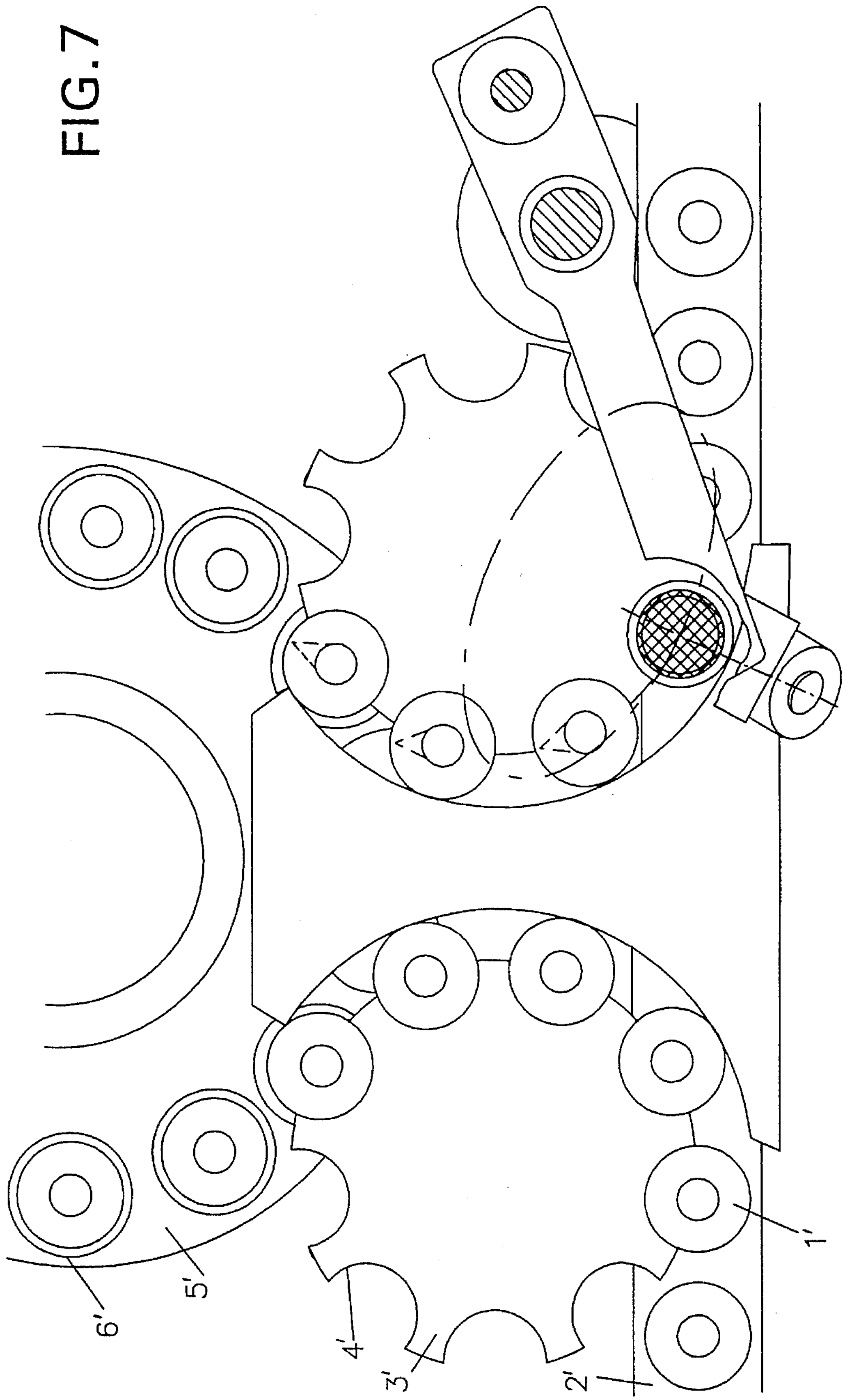
FIG. 7 shows a schematic view of a section of a bottling and filling machine according to the present invention.

In the embodiment of the invention shown in FIG. 7, containers 1' are transported by a conveyor 2' and by a feeder star wheel 3' with receptacles 4' located on its outside circumference to a turntable 5'. From the turntable 5', containers 1' are transported to a discharge star wheel 7', while being axially braced between cam-controlled plate 6' and a centering head (not shown).

Figure 8:
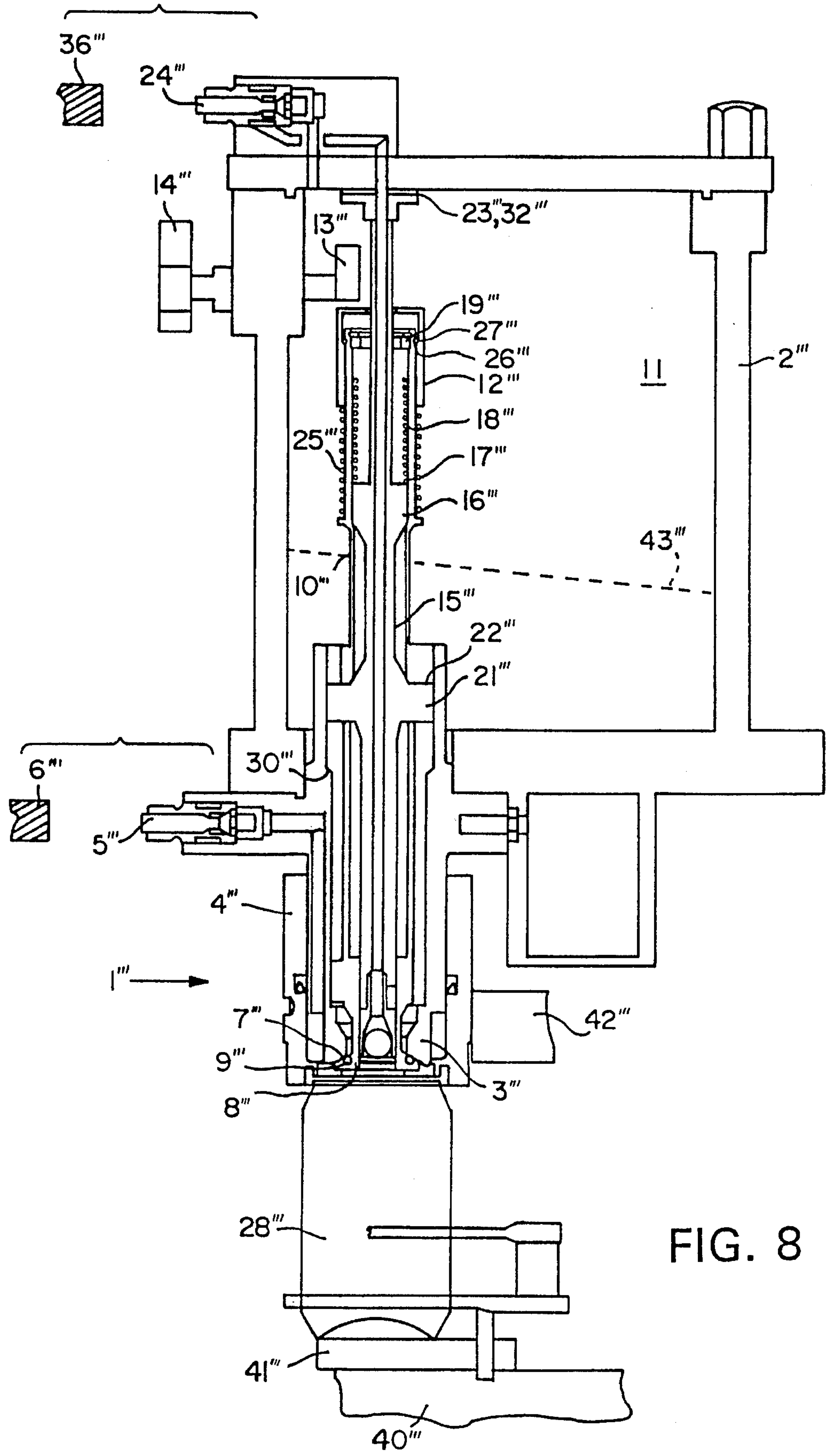
FIG. 8 shows the filler valve in the closed position.
Figure 9:
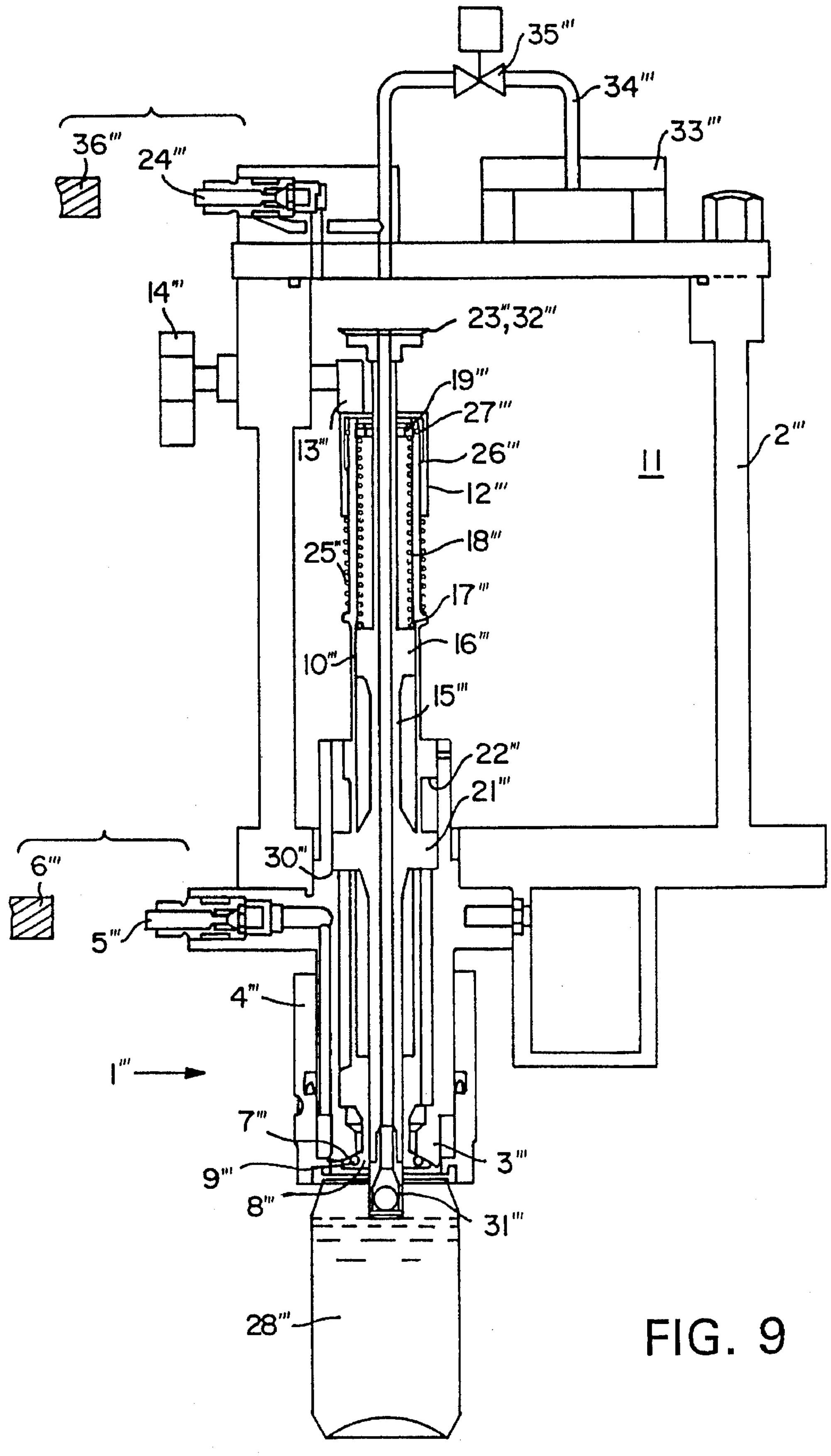
FIG. 9 shows the filler valve in the open position and one variant of the filler valve with feed lines for sterilization measures.

For the following discussion of FIGS. 8 and 9, it should be generally understood that the filling machine has an overall cylindrical appearance, wherein a fluid reservoir 2'" having a generally toroidal shape can define at least an outer circumference of the filling machine. FIG. 8 shows a cross-sectional view through an outer circumferential portion of what could be called a filling station of such a filling machine. In essence, a plurality of such filling stations as depicted in FIG. 8 can be located, essentially side by side, and along substantially the entire periphery of the filling machine. Below each filling station, there can typically be a turntable 40'" which rotates along with the filing machine, and which turntable can have a number of support plates 41'" for supporting, with respect to each filling station, a container 28'" to be filled. The general mode of transport of containers is essentially well known, as shown by some of the patents listed herebelow, and therefore is not discussed in any more detail herein.

In the embodiment illustrated in FIG. 8, filler valve 1'" is located on a ring-shaped reservoir 2'" of a rotating filling machine, not illustrated in any greater detail in a circular sequence. The filler valve 1'" has a bottom housing 3'", on which a centering bell, or tulip, 4'" with a contact gasket can be raised and lowered. Mechanisms for raising and lowering such a centering bell, depicted only schematically as 42'" in FIG. 8, can include a cam and a cam follower, which are generally well known as shown by some of the patents listed herebelow, and are therefore not discussed in any further detail herein.

The housing 3'" can preferably be configured with a flush valve 5'", which can be opened one or more times by control rails 6'" as a function of the desired process. Control of such valves 5'" is also generally known as shown by some of the patents listed herebelow, and is therefore also not discussed in any further detail herein.

On the lower end of the housing 3'", there can preferably be a sealing arrangement (not shown in any detail) for sealing the housing 3'" to a container 28'". The lower end of the housing 3'" can also have a valve seat 7'", with which the valve closing body 8'" with its gasket 9'" are in contact when the filler valve is closed. The valve closing body 8'", as shown, has a tubular extension 10'" which can extend into the upper space 11'" of the toroidal fluid reservoir 2'", that is above the surface 43'" of the liquid. By means of the extension 10'", the valve closing body 8'" can be moved downwardly into an open position to allow fluid to flow therethrough and into a container sealed to the housing. This movement, as discussed in more detail further below, can preferably be brought about by means of a control cam 13'" of a control pinion 14'", which can act on a pressure sleeve 12'", with a corresponding spring 24'", disposed about the extension 10'".

A gas pipe 15'" can preferably be located inside the valve closing body 8'" and can preferably extend through the extension 10'". In its central portion, the gas pipe 15'" can preferably have an enlargement 16'", which can also be designed as a plastic bushing. This bushing, or enlargement 16'" can preferably be configured for guiding the extension 10'" therearound. A first biasing device, such as spring 18'" can have a lower end 17'" braced against this enlargement 16'". An upper end of this spring 18'" can be braced against a portion of the extension 10'" which portion of the extension 10'", as shown in the figures, can be an inner ring 19'" disposed circumferentially within the extension 10'". In this manner, the valve closing body 8'" and the gas pipe 15'" can be biased against one another, that is, in opposite directions to one another. Also, because movement of the gas pipe 15'" and closing body 8'" generally are dependent on the prevailing pressure within the reservoir 2'", pressure differentials, and pressure force acting on surface areas of different sizes for each of the closing body 8'" and gas pipe 15'", the spring 18''' can also assist in the application of forces needed to provide a proper operating sequence of the valve parts. As such, the valve closing body 8''' can be held in the closed position, even when the priming valve 24''' is open with the mutual prestressing of the extension 10''' of the valve closing body 8''' with the gas pipe 15''', webs 21''' of the gas pipe 15''' can be held in contact with correspondingly configured webs 22''' of the extension 10'''. Consequently, the valve closing body 8''' can be held in the closed position.

At the upper end of the gas pipe 15''', that is, the end opposite the valve closing body 8''', there can preferably be a sealing body 23''' which call be moved by the control cams 13''' of the control pinion 14''' into the upper position against the top plate of the reservoir 2'''. Once the sealing body 23''' is in this upper, sealed position, the sealing body can essentially be held in place by means of the overpressure within the reservoir 2'''. In other words, the overpressure within the reservoir 2''', because of the larger lower surface area of the sealing body 23''', will push the sealing body 23''' into engagement with the top plate of the reservoir 2'''. When the gas pipe 14''', is in the upper position as shown in FIG. 8, a direct connection to the priming valve 24''' can then be established.

In this closed position of the filler valve 1''', the pressure sleeve 12''' can be held in the upper position by means of a second biasing device, such as the second spring 25''', as briefly mentioned previously. This second spring 25''' can preferably have a greater prestress than that of the first spring 18''', and when the cam 13''' is rotated out of contact with the pressure sleeve 12''', a projection 26''' of the sleeve 12''' can be biased into contact with a stop 27''' of the extension 10''' of the valve closing body 8'''.

Further descriptions of the components of the present invention are set forth herebelow with regard to the operation of the apparatus of the present invention in carrying out a filling operation of a container. It should be understood that, as the following process steps are being performed, the filling machine and containers are being moved along a generally circular path defined by the filling machine, and operation of certain valve components are typically carried out by means of fixed camming devices disposed about the periphery of the filling machine.

To fill a container 28''' with the liquid under pressure in the reservoir 2''', first a container 28''' is moved by a feed star wheel (not shown) or other similar device onto a support plate 41''' under the ring-shaped reservoir and and into position under a corresponding filler valve 1''', which is then located in the container intake area. The centering bell 4''' with its application gasket is then lowered over the mouth of the container 28''' by guide rollers and cam rails which are not shown in any further detail. Alternately, although not shown in the drawings, apparatus could be provided to raise the container 28''' into contact with the centering bell 4''', and thus, in the broadest concept, at least one of the centering bell 4''', and the container 28''' can be moved towards the other of the centering bell 4''' and the container 28''' so that a seal can be established about the mouth of the container 28'''. The interior of the container 28''' is then essentially sealed from the surrounding atmosphere.

As soon as a seal has been established, the filling, per se, can be initiated. In the initial stages of the filling process, the apparatus and beverage container will therefore be in positions as represented by FIG. 8, with the gas pipe raised all the way to the upper plate of the reservoir 2''', and the valve body 8''' in a closed position. As an initial step of the filling process, if a flushing operation is desired, the flush valve 5''' can be opened, and the priming valve 24''' can be actuated by a cam rail 36'''. The priming valve 24''' can then be operated to provide a short circuit with the pressurized reservoir gas, or can connect to an alternate fresh gas supply, such as a pressurized carbon dioxide source. The flushing process can then be initiated, whereby the pressurized gas can flow through the valve 24''', down the gas pipe 15''', into the container, and then out the open flush valve 5'''.

If it is considered necessary, or desirable, there can also be a corresponding evacuation of the inside of the container, or a corresponding disinfection steam sterilization etc. As shown in FIG. 9, there can be an additional toroidal chamber 33''' located above the actual toroidal reservoir 2''', with feed lines which can be used to supply a sterilization agent, e.g. sterilized air, steam etc., and which can have a direct connection to the gas pipe 15''' by means of the feed lines 34'''. As an alternative to operation via the valve 24''', such a system can alternately be actuated by means of special control valves 35'''. Further details regarding such a sterilization system, etc, and the operation of the valves is not provided herein as such is deemed to be well known as shown by some of the patents listed herebelow.

As soon as the various preparatory and/or sterilizing measures of the inside of the container have been completed, the priming of the interior of the container to the internal pressure prevailing in the filling machine reservoir can then take place. For this purpose, the flush valve 5''' can preferably be closed, and the priming valve 24''' can then be opened to provide a short circuit with the pressurized interior of the reservoir 2'''. In this manner, an equalization of the pressure in the container 28''' with the prevailing pressure in the reservoir 2''' can take place.

After the gas pressure equalization has occurred, the rotary pinion gear 14''' can then be actuated by contact with a cam rail, whereby any pressure of the cam 13''' pressing the sealing body 23''' upwardly can be released. The gas pipe 15''' will then typically move downward by the prestress of the inner spring 18'''. After travelling a short distance, the webs 21''' then come into contact with their lower end surface against a stop 30''' on the housing 3''', whereupon the lower limit position of the gas pipe 15''' is reached. This position is illustrated in particular in FIG. 9.

As a further explanation for the above discussed downward movement of the gas pipe 15''' one should generally again consider the gas pressure forces acting on the different surface areas of the gas pipe 15''' and the valve body 8'''. In essence, for the spring 18''' to move the gas pipe 15''' downwardly, the valve body 8''' and extension 10''' should preferably remain in their closed, or farthest raised position. This will essentially be true, as the gas pressure in the container 28''' is essentially the same as the pressure inside the reservoir 2'''. Thus, because of the larger surface area on the underside, or container side of the valve body 8''', the pressure force acting upwardly on the valve body 8''' from the container side is typically greater than any pressure force acting downwardly on the valve body 8''' from the reservoir side. Thus, the valve body 8''' can remain tightly closed, and the spring 18''' can bias the gas pipe 154''' downwardly to lower the gas pipe 15''' into the container as depicted in FIG. 9.

By means of further actuation of the rotary pinion gear 14''', the control cam 13''' can reach the upper end surface of the pressure sleeve 12'''. Then by applying a camming pressure against the top of the pressure sleeve 12''', the pressure sleeve 12''' can be displaced downwardly, and can act, or compress the outer spring 25'''. Then once a sufficient pressure has been applied by the cam 13''', via the spring 25''',to the valve body 8''', that is a pressure sufficient to overcome the gas pressure force acting to hold the valve body 8''' closed, as well as the biasing force of the inner spring 18''', an opening of the filler valve 8''' can occur. This opening of the valve body 8''' can essentially occur because the outer spring 25''' has a greater prestress than the inner spring 18'''.

If desired, once the opening of the valve body 8''' has been effected, the control cam 13''' can continue to travel a slight extra distance, and the control cam can then be maintained in this position until the liquid has filled the container 18'''. Once opened, the liquid in the ring-shaped reservoir 2''' can now flow under the effect of the geodetic, or gravitational gradient into the container 28'''. As the liquid flows in around the valve body 8''', the gas present in the container can exit via the gas pipe 15''' into the upper portion 11''' of the reservoir 2'''. As shown in FIG. 9, with the end 31''' of the gas pipe 15''' in its lower position, the end 31''' of the gas pipe, while allowing gas to escape from the container into the air space above the reservoir, can also be simultaneously responsible for determining the level to which the liquid is to be filled in the container 28'''. In other words, once the level of liquid in the container 28''' reaches the lower end 31''' of the gas pipe 15''', no additional gas exchange with the reservoir is possible, and in this manner the final fill level can be established. In one possible embodiment of the end 31''' of the gas pipe 15''', the end 31''' could contain a float valve, which has a float therein that blocks the gas pipe 15''' once the level of the liquid rises sufficiently to raise the float into the opening of the gas pipe 15'''.

Once the container is filled, and upon a further movement of the container about the path defined by the filling machine, the control cam 13''' of the rotary pinion gear 14''' can once again be moved upward. The pressure sleeve 12''' with its stopping edge thereby moves toward the stop ring 27''', so that the outer spring 25''' becomes inactive, that is, the pressure of the outer spring 25''' on the pressure sleeve 12''' is alleviated. Once this pressure on the spring 25''' is alleviated, the closing process for the valve closing body 8''' is essentially automatically initiated.

While the cam 13''', has released the pressure of the outer spring 25''' the gas pipe 15''' will still remain in its lower stop position, as a function of the pressures in the system, and the inner spring 18''' will typically exert the force required to raise and thereby close the valve closing body 8'''. After a short idle stroke, the upper portion of the control cam 13''' then comes into contact with the lower end surface of the sealing body 23''' and upon further movement of the cam 13''', the cam 13''' thereby also moves the gas pipe 15''' to the stop 22''' of the extension 10''' of the valve closing body 8''' and thus into the upper stop position. In this upper position, the gasket 32''' thereby comes into contact against the inner top surface of the reservoir interior and simultaneously creates a connection to the priming valve 24'''.

Once the valve body 8''' and the gas pipe 15''' are returned to their upper position, a depressurization of the inside of the container above the surface of the liquid can then be accomplished by opening the flush valve 5'''. Finally, after the centering bell 4''' has been raised, the filled container can be removed from the filling machine.

As discussed previously, the embodiment illustrated in FIG. 9, shows an optional configuration of the filling machine wherein there can be an additional toroidal chamber 33''' located above the actual toroidal reservoir 2'''. This additional chamber 33''' can have feed lines which can be used to supply a sterilization agent, e.g. sterilized air, steam etc., and can have a direct connection to the gas pipe 15''' by means of the feed lines 34''', which can be appropriately actuated by means of special control valves 35'''.

In particular with sterilization means supplied at an elevated temperature, the toroidal chamber 33''' could alternately be located at a certain distance from the toroidal reservoir 2''', and insulation could be disposed between the chamber 33''' and the reservoir 2''' to prevent a transmission of heat to the toroidal reservoir 2''' and/or to the liquid being filled into the containers.

One of the biggest advantages which is provided by the present invention lies in the ability to essentially eliminate an additional device for determining whether a container 28''' is located beneath a filler valve 8''', and thereby also eliminate any additional operational controls which may be different from the normal operational controls when a container 28''' is present. In essence, the apparatus provided by the present invention can follow the same operational controls both with and without a container being present, thereby significantly simplifying the operation of the filling machine.

With the embodiment of the present invention as discussed above, if there is no container 28''' to be filled, located below the centering bell 4''', a sealed chamber is not established at the fill end of the centering bell. Thus, when the normal pressurization step occurs, for example, when the valve 24''' connects the gas tube 15''' with the pressurized interior of the reservoir 2''', there will not be an increase in the pressure underneath the filler valve. Thus, since the gas pressure inside the reservoir 2''' that is acting to push the sealing body 23''' upwards to the upper plate of the reservoir 2''' is greater than the atmospheric pressure existing within the gas pipe 15''' and below the centering bell 4''', the application force of the gasket 23''' remains fully intact. Thus the web 21''' remains in firm contact against the stop 22''' of the extension 10''' of the valve body 8'''. Then, when in the normal order of operation, the cam 13''' depresses the sleeve 12''' against the force of the spring 25''', the filler valve can remain closed In essence, the force of the compressed spring 25''' is not sufficient to overcome the force of the gas pressure holding the gas pipe 15''' in place.

In essence, although the pinion gear 14''' will still pivot into the open position, and thus exert a force on the sleeve 12''' and the spring 25''', the valve body 8''' can remain in the closed position on account of the pressure difference between the pressure inside the reservoir and the external pressure. Therefore, there is essentially no need for a special actuation system for the rotary pinion 14''' to alter the operation of the cam 13''' when a container is not present below the filling valve 8'''.

The present invention provides an additional advantage in that the lowered position of the gas pipe 15''' provides the filling level of the container and once the filling level has been reached, and the valve body 8''' closed, no additional liquid is added to the container. This, as stated previously can be accomplished by means of the float, or check valve disposed in the lower end of the gas pipe 15''', which can block fluid from entering into the gas pipe 15'''. In some known filling machines, such as some of the filling machines described by the patents listed herebelow, the fluid enters up the gas pipe 15''' to the level of fluid in the reservoir. Then after the valve is closed, this fluid is purged from the gas pipe in to the container, thereby affecting the level of fluid in the container. It can easily be seen that the amount of fill in such a known system is therefore dependent on the fluid level in the filling reservoir. Therefore, with the present invention, since essentially no fluid can enter the gas pipe 15''', a purging of the gas pipe 15''', along with any additional devices for carrying out the purging, are not needed to empty the gas pipe 15''', and the level of fluid in each container can essentially always be constant.

One additional advantage of the present invention over the known systems is that the gas pipe 15''' can be used as the passage for purging the container with gas, and for sterilization etc. as discussed above. The configuration of the present invention enables the thereby essentially eliminates any other complicated valving and passages which have previously been used to supply the purging gas and the sterilization etc. In essence, with the present invention, only a simple, short and straight bore needs to be made in the top of the reservoir for connecting the gas pipe to any additional gas supplies.

Figure 10:
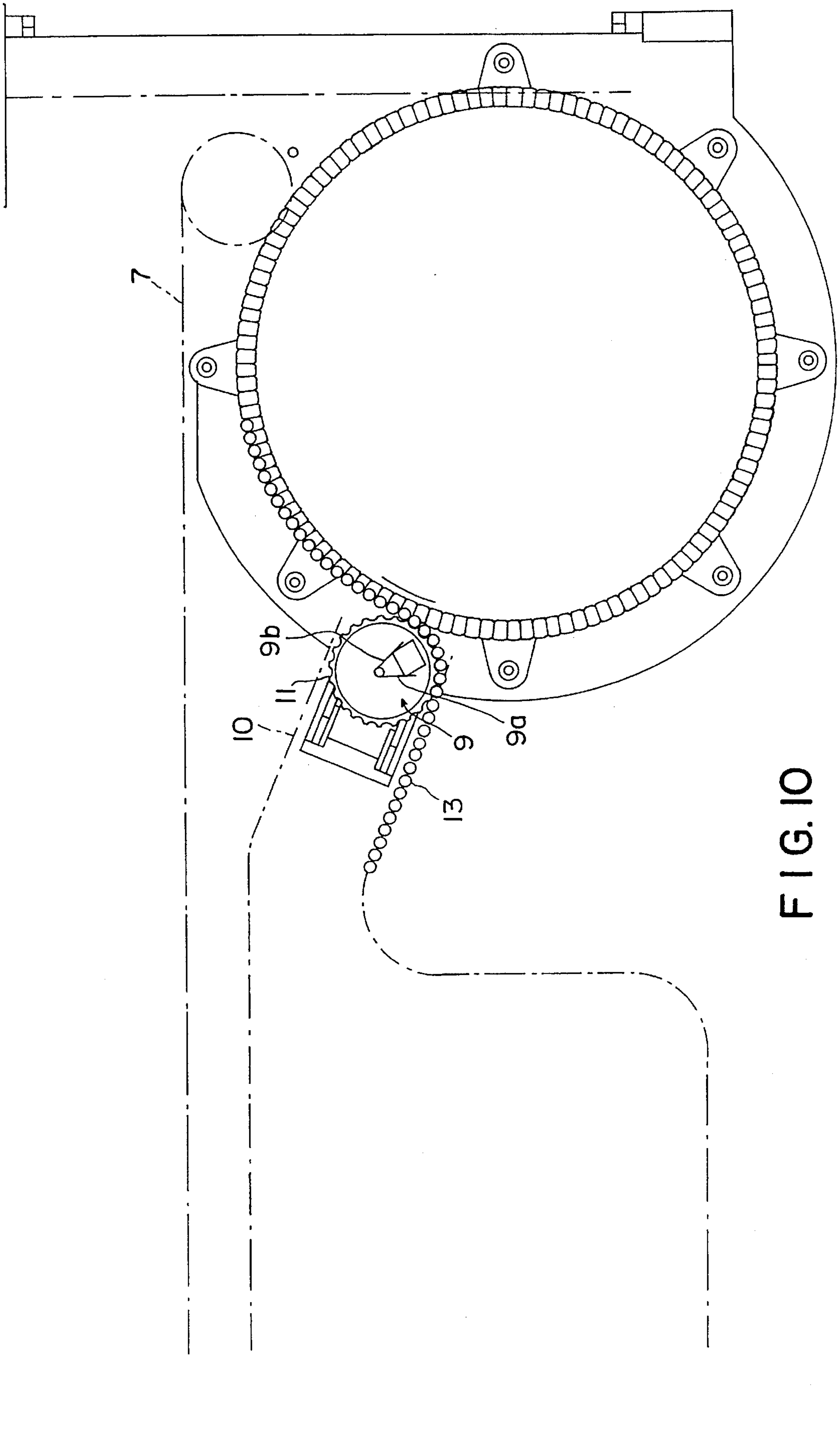
FIG. 10 shows an alternative embodiment of the invention.

In FIG. 10 an alternative embodiment is shows which has arms 9*a* and 9*b* which may grasp the containers and remove them from the ring gear or platform 5 onto the discharge conveyor 13. Alternatively other well known apparatus for removing cans and bottles could be used to remove the containers and even insert the containers into the ring gear or platform 5.

One feature of the invention resides broadly in the process for cleaning container handling machines with handling stations, e.g. filling and closing elements, rotating on a ring gear or indexing gear or turntable or circular track, whereby specially designed washing or rinsing containers are individually attached to the handling stations to clean them, and are placed in circulation with the container handling machine, and are removed once again after the cleaning of the handling stations, characterized by the fact that a feed device which can be brought into contact from outside against the ring gear of the container handling machine is placed together with the ring gear into a feed position, and the individual washing containers are fed one after another to the feed device, and are moved by the feed device into a locking position and are connected to and circulate with the handling stations, and after the completion of the washing process, they are separated by the feed device from the handling stations and removed from the ring gear away from the container handling machine.

Another feature of the invention resides broadly in the apparatus for the performance of the process characterized by the fact that the washing container is transported from a parked position to a star wheel 11 of the feed device 9, and from there it is transported to a control finger 16 which picks up the washing container and moves it against the force of a spring 3 into the position where it is taken over by the handling station, whereupon the handling station is lowered and the washing container can be connected to the handling station by releasing the outer shell 2.

Yet another feature of the invention resides broadly in the apparatus for the performance of the process with a two-part washing container, the outer housing of which is in contact under the force of a spring with the inner washing housing, and is equipped with a locking connection, characterized by the fact that the outer housing 2 is moved by a control finger 16 of the star wheel 11 into a lower locking position, and after the handling station is lowered, the outer housing 2 can be locked to the handling station and thus releasing the outer housing 2 from the feed device 9.

Still another feature of the invention resides broadly in the apparatus characterized by the fact that the feed device 9 is formed by a feed conveyor 7, a star wheel 11 and a slide 12 which can be inserted below the plane of movement of the rotating handling stations, and each locator pocket 14 of the star wheel 11 has a cam-controlled control finger 15 for the locking elevating movement of the washing container.

A further feature of the invention resides broadly in the apparatus characterized by the fact that in the operating position, the feed device 9 can be driven directly by the ring gear or platform 5 of the container handling machine.

Another feature of the invention resides broadly in the apparatus characterized by the fact that the drive means are located on the outer shell of the ring gear or platform 5 of the container handling machine, and are engaged in its drive means 19 by moving the feed device 9 into the operating position.

Yet another feature of the invention resides broadly in the apparatus characterized by the fact that the delivery of the washing containers to the vicinity of the ring gear or platform 5 takes place during the otherwise conventional descending movement of the filling-valve centering body, which forms a seal with the container.

Some examples of types of filling machines which provide additional operation aspects thereof, as well as components and accessories which can be used in conjunction with the present invention are disclosed by the following U.S. Patent: U.S. Pat. No. 5,119,853 entitled "Apparatus for Filling Cans With a Liquid", U.S. Pat. No. 5,042,536 entitled "Can Filling Apparatus Having a Vent Tube Movable Relative to a Fill Tube", U.S. Pat. No. 5,040,574 entitled "Can Filling Apparatus Having an Improved Gas Venting Mechanism", and U.S. Pat. No. 4,938,261 entitled "Apparatus for Filling Cans With a Liquid", each of which has the inventors Petri, Rademacher and Sindermann (an inventor of the present invention); U.S. Pat. No. 4,679,603 entitled "Filling Machine for Filling Liquid Under Counterpressure", and U.S. Pat. No. 4,635,690 entitled "Filling Valve for Use in the Bottling of Liquids", both of which have the inventors Rademacher, Sindermann and Sushardt; U.S. Pat. No. 3,908,717 to Rademacher et al., entitled "Apparatus for Filling Beer Cans or the Like"; and U.S. Pat. No. 3,889,725 to Rademacher et al., entitled "Method of Filling Beer Cans or the Like".

Some examples of types of labeling machines which provide additional operation aspects thereof, as well as components and accessories which can be used in conjunction with the present invention are disclosed by the following U.S. Patents: U.S. Pat No. 4,944,830 entitled "Machine for Labelling Bottles", which has inventors Zodrow, Rogall, Hoveler, and Buchholz; U.S. Pat. No. 5,129,984 entitled "Bottle Labelling Machine", which has inventors Tomashauser and Zodrow, and U.S. Pat. No. 5,174,851 entitled "Labelling Machine for Labellng Containers", which has inventors Zodrow, Buchholz, and Rogall.

Some examples of types of cleaning machines which provide additional operation aspects thereof, as well as components and accessories which can be used in conjunction with the present invention are disclosed by the following Patents: DE-PS Patent No. 9 70 580, DE-PS Patent No. 9 45 910, GB Patent No. 12 33 356, AU Patent No. 2 30 683, and U.S. Pat. No. 3,513,024.

Some examples of types of machines utilizing star wheel and cams which provide additional operation aspects thereof, as well as components and accessories which can be used in conjunction with the present invention are disclosed by the following U.S. U.S. Patents: U.S. Pat. No. 5,295,345 entitled "Bag Sealer", which has inventors Haar and Herman; U.S. Pat. No. 5,221,058 entitled "Registration control for continuously moving laminated package apparatus", which has inventor Fillis; U.S. Pat. No. 5,227,005 entitled "Labelling Station for Labelling Objects, Such As Bottles", which has inventors Zodrow and Buchholz; U.S. Pat. No. 5,269,864 entitled "High Speed Labelling Machine", which has inventor Otruba; U.S. Pat. No. 5,261,207 entitled "Machines For the Treatment of Bottles", which has inventor Bedin; and U.S. Pat. No. 5,185,053 entitled "Brushing Station for a Labelling Machine for Labelling Bottles and the Like", which has inventors Tomashauser and Zodrow.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. P 43 32 202.6, filed on Sep. 22, 1993, having inventors Klaus-Friedrich Stock and Siegmar Sindermann, and DE-OS P 43 32 202.6 and DE-PS P 43 32 202.6, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A process for cleaning container handling machines having a plurality of container handling units, the container handling units comprising means for admitting a substance into containers, the container handling machine having a substantially cylindrical shape and defining a periphery and an axis of rotation about which the container handling machine rotates, the container handling units being disposed about the periphery and moved by the container handling machine in a substantially circular path, each container handling unit comprising a container receiving portion; the apparatus for cleaning comprising a container supply station, the container supply station comprising: a plurality of washing container means for containing a cleaning substance for cleaning at least the means for admitting a substance into containers positioned in the container handling units, each of the plurality of washing container means comprising connecting means for being connected with a corresponding container handling unit, for connecting each of said washing container means to corresponding container handling units for movement of the connected washing container means about the substantially circular path along with its corresponding container handling unit; and container feed means for feeding the washing container means to the container handling units from the container supply station, and for feeding the washing container means from the container handling units to the container supply station; and the apparatus further comprising means for moving the container supply station towards and away from the container handling machine and for positioning the container feed means adjacent the substantially circular path at least during cleaning of the container handling units, and for positioning the container feed means away from the substantially circular path to provide an unobstructed path about the container handling machine; the container supply station further comprising a container holding area; the washing container means comprising washing containers, the washing containers each comprising a first container-shaped portion containing the cleaning substance therein, and the connection means for connecting the container-shaped portion to the handling units, the connecting means being movable with respect to the container-shaped portion between a release and a connecting position for releasing and connecting the connecting means with the container handling units; the container feed means comprising means for moving the connecting means with respect to the container-shaped portion, the container-shaped portion of the washing containers comprising a substantially cylindrical member having a bowl-shaped containment area for containing the cleaning substance therein, the bowl-shaped containment area defining a first end of the container-shaped portion; the connecting means comprising a sleeve-shaped member disposed concentrically about the bowl-shaped containment area, the sleeve shaped member having a first end, and the sleeve shaped member being movable between the connecting position with the first end of the sleeve-shaped member extending beyond the first end of the container-shaped portion, and the release position with the first end of the sleeve-shaped member disposed at least adjacent but not beyond the first end of the container shaped portion; and the sleeve shaped member having a second end opposite the first end, the second end comprising slot means for being engaged by said means for moving the connecting means; the means for moving comprising at least one engagement finger for engaging in the slot means to extend and retract the first end of the sleeve-shaped member with respect to the first end of the container-shaped portion; and the washing container additionally comprising biasing means for applying a biasing force to the connecting means to bias the connecting means into the connecting position;

said method comprising the steps of:

- introducing the cleaning substance into the plurality of washing container means;
- rotating the container handling machine to move the container handling units about the circular path;
- moving the container supply station to a position adjacent the container handling machine with the container feed means adjacent the substantially circular path;
- feeding ones of the washing container means from the container supply station to corresponding ones of the plurality of container handling units as the container handling units move past the container supply station;
- connecting each washing container means to its corresponding container handling unit for movement with its corresponding handling unit about the circular path;
- washing at least a portion of each container handling unit during movement of the container handling units about the circular path;
- removing the washing container means from the container handling units after said washing;
- moving the container supply station away from the container handling machine to provide an unobstructed path about the container handling machine;
- feeding the washing containers from the container holding area to the container receiving portion of the container handling units with the container feed means;

after feeding of the washing containers to the container receiving portions of the container handling units, moving the connecting means of the washing containers with respect to the container-shaped portion of the washing container from the release position to the connecting position to connect the washing containers to the container handling units;

after washing the container handling units, moving the connecting means of the washing containers with respect to the container-shaped portion of the washing container from the connecting position to the release position to release the washing containers from the container handling units;

feeding the released containers from the container handling units back to the container holding area with the container feed means;

said moving of the connecting means into the connecting position from the release position comprising biasing the connecting means into the connecting position; and said moving of the connecting means from the connecting position to the release position comprising applying a force opposite to the biasing force to move the connecting means from the connecting position to the release position;

during said feeding of the containers from the container holding area to the container receiving portion, engaging the at least one engagement finger in the slot means, and moving the sleeve-shaped member against the biasing force into the release position;

positioning the containers in the container receiving portion;

removing the at least one engagement finger from the slot means thereby permitting the sleeve-shaped member to move from the release position to the connecting position to connect the washing containers to the container handling unit; and after washing the container handling units, engaging the at least one engagement finger with the slot means, moving the sleeve-shaped member from the connecting position to the release position, and removing the washing containers from the container handling unit.

2. The method according to claim 1, wherein the feeding means comprises a star wheel, the star wheel having receptacles for receiving washing containers therein, and the means for moving the connecting means comprises a cam, and a cam follower, the cam follower being connected to the at least one engagement finger, and the cam follower moving with the receptacles of the star wheel for coordinating movement of the sleeve-shaped member with rotation of the star wheel, and said method further comprises:

rotating the star wheel to feed washing containers from the container holding area to the container receiving portion; and simultaneously moving the cam follower in conjunction with the star wheel to move the at least one engagement finger and coordinate movement of the sleeve-shaped member with the movement of the star wheel.

3. The method according to claim 2, wherein the container holding area comprises a conveyor having the plurality of washing containers disposed thereon, and said method further comprises:

moving the conveyor in a direction towards the star wheel;

feeding washing containers to the star wheel from the moving conveyor;

feeding containers from the container handling unit to the conveyor; and moving the conveyor in a direction away from the star wheel to move the containers away from the star wheel.

4. The method according to claim 3, wherein the feed means further comprises a table slidable into the circular path under the container receiving portion of the container handling unit, the star wheel being rotatable above the table, and the washing containers being fed to the container receiving portion on the table; and said moving of the container supply station to a position adjacent the container handling machine comprises moving the container supply station to position the table directly in the circular path and under the container receiving portion of the container handling unit.

5. The method according to claim 4, wherein the star wheel comprises drive means for rotatably driving the star wheel and said method further comprises driving the drive means of the star wheel with the container handling machine to directly correspond the rotation of the star wheel with the rotation of the container handling machine.

6. The method according to claim 5, wherein the container handling machine has a cylindrical outer periphery, said drive means comprises means for engaging with the outer periphery, and said method further comprises:

during moving the container supply station to position the table directly in the circular path and under the container receiving portion of the container handling unit, engaging the means for engaging of the drive means directly with the cylindrical outer surface of said container handling machine;

rotating the container handling machine to drive said drive means; and rotating the star wheel as a direct function of the rotation of the container handling machine.

7. The method according to claim 6, wherein the container handling units comprises filler valve movable between a raised and lowered position, and said method further comprises:

feeding the washing containers into the container handling units with the filler valve in the raised position; and moving the filler valves into the lowered position after connecting the washing containers to the container handling units to move the filler valves into the cleaning substance in the washing containers to clean the filler valves.

8. Apparatus for cleaning container handling units of a container handling machine, the container handling units comprising means for admitting a substance into containers positioned adjacent the container handling units, the container handling machine having a substantially cylindrical shape and defining a periphery and an axis of rotation about which the container handling machine rotates, the container handling units comprising a plurality of container handling units disposed about the periphery and moved by the container handling machine in a substantially circular path, each container handling unit comprising a container receiving portion for receiving containers, said apparatus for cleaning comprising:

a container supply station, said container supply station comprising:

a plurality of washing container means for containing a cleaning substance therein, for cleaning at least the means for admitting a substance into containers positioned adjacent the container handling units, each of said plurality of washing container means comprising connecting means for being connected with a corresponding container handling unit;

container feed means for feeding the washing container means to the container handling units from the container supply station, and feeding the washing container means from the container handling units to the container supply station;

means for moving the container supply station towards and away from the container handling machine for positioning the container feed means adjacent the substantially circular path at least during cleaning of the container handling units, and for positioning the container feed means away from the substantially circular path to provide an unobstructed path about the container handling machine;

said washing container means comprise washing containers, said washing containers each comprising:

a first container-shaped portion for containing the cleaning substance therein; and a second portion, said second portion comprising said connecting means for connection said first container-shaped portion to the container handling units, said connecting means being movable with respect to said first container-shaped portion between a release and a connecting position to release and connect said connecting means with the container handling units;

said container feed means comprising means for moving the connecting means with respect to said container-shaped portion to release and connect said washing containers to the container handling units;

said container-shaped portion of said washing containers comprising a substantially cylindrical member having a containment area for containing the cleaning substance therein;

said containment area defines a first end of said container-shaped portion;

said connecting means comprises a sleeve-shaped member disposed concentrically about the containment area, said sleeve-shaped member having a first end for engaging with the container receiving portion of the container handling units, and a portion for engaging with said containment area to hold said containment area to the container receiving portion of the container handling units;

said sleeve-shaped member being movable between the connecting position with the first end of said sleeve-shaped member extending beyond the first end of said container-shaped portion, and the release position with the first end of said sleeve-shaped member disposed at least adjacent but not beyond said first end of the container shaped portion;

said sleeve-shaped member having a second end opposite the first end, the second end comprising slot means for being engaged by said means for moving the connecting means;

said means for moving the connecting means comprising:

at least one engagement finger for engaging in said slot means to extend and retract the first end of said sleeve-shaped member with respect to the first end of said container-shaped portion; and means for moving said at least one engagement finger to move said sleeve-shaped member.

9. The cleaning apparatus according to claim 8 wherein each of said plurality of washing container means comprises connecting means for being connected with a corresponding container handling unit for connecting each of said washing container means to its corresponding container handling unit for movement of the connected washing container means about the substantially circular path along with its corresponding container handling unit.

10. The cleaning apparatus according to claim 9 wherein said containment area for containing the cleaning substance therein, comprises a bowl-shaped containment area.

11. The cleaning apparatus according to claim 10, wherein:

each said washing container additionally comprises biasing means for applying a biasing force to said sleeve-shaped member to bias said sleeve-shaped member into the connecting position from the release position; and said means for moving said at least one engagement finger comprises means for moving said at least one engagement finger in opposition to said biasing force to move said sleeve-shaped member from said connecting position to said release position.

12. The cleaning apparatus according to claim 11, wherein:

said feeding means comprises a star wheel, the star wheel having receptacles for receiving washing containers therein;

said means for moving the connecting means comprises:

a cam; and a cam follower, said cam follower being connected to said at least one engagement finger, and said cam follower moving with the receptacles of said star wheel for coordinating movement of said sleeve-shaped member with the rotation of said star wheel.

13. The cleaning apparatus according to claim 12, wherein:

said container supply, station comprises a container holding area;

said container holding area comprises a conveyor for moving the plurality of washing containers;

said conveyor comprises a first conveyor portion for moving washing containers toward said star wheel to feed the washing containers to said star wheel for the washing of container handling units; and said conveyor comprises a second conveyor portion for receiving containers from said star wheel after washing of container handling units and for moving washing containers away from said star wheel.

14. The cleaning apparatus according to claim 13, wherein:

said feed means further comprises a table slidable into the circular path under the container receiving portion of the container handling units during movement of the container supply station towards the container handling machine;

said table being configured for supporting washing containers thereon under said means for receiving containers prior to connection of said washing containers with said means for receiving containers; and said star wheel is rotatable above the table, and the washing containers are fed along the table to the container receiving portion.

15. The cleaning apparatus according to claim 14, wherein:

said star wheel comprises drive means for rotatably driving said star wheel; and said drive means comprising means for engaging with the container cleaning machine to rotate said star wheel directly with rotation of the container cleaning machine.

16. The cleaning apparatus according to claim 15, wherein:

said means for engaging with the container cleaning machine comprises a roller for rolling along a surface of the container cleaning machine as the container cleaning machine rotates;

said container supply station comprises wheels for moving said container supply station towards and away from the container handling machine;

said container-shaped portion of said washing containers comprises:

a base portion having a first diameter; and a pedestal portion extending from said base portion, said pedestal portion having a second diameter, said second diameter being less than said first diameter said pedestal portion having an end disposed opposite said base portion;

said bowl-shaped portion is disposed at the end opposite said base portion;

said bowl-shaped portion has a diameter greater than said pedestal portion;

said sleeve-shaped portion comprises a flange at said second end of said sleeve-shaped portion, said flange extending radially inwardly towards said pedestal portion; and said biasing means comprises a spring disposed between said flange and said base portion.

17. Apparatus for cleaning beverage container handling units of a liquid container filling and handling machine, the beverage container handling units comprising means for admitting a liquid into beverage containers positioned adjacent the beverage container handling units, the liquid container filling and handling machine having a substantially cylindrical shape and defining a periphery and an axis of rotation about which the liquid container filling and handling machine rotates, the beverage container handling units comprising a plurality of beverage container handling units being disposed about the periphery and being moved by the liquid container filling and handling machine in a substantially circular path;

said cleaning apparatus being a unitary apparatus distinct and separate from the liquid container filling and handling machine, said cleaning apparatus comprising:

a washing container supply station, said washing container supply station comprising:

a plurality of washing container means for containing a cleaning substance therein for cleaning at least the means for admitting a substance into beverage containers positioned adjacent the beverage container handling units;

each of said plurality of washing container means comprising connecting means for being connected with a corresponding beverage container handling unit;

washing container feed means for feeding the washing container means to the beverage container handling units from the washing container supply station; washing container means from the beverage container handling units to the washing container supply station; means for moving the entire apparatus for cleaning with the washing container supply station towards, and away from and out of contact with the liquid container filling and handling machine, and for positioning the washing container feed means adjacent the substantially circular path at least during cleaning of the beverage container handling units, and for positioning the washing container feed means away from and out of contact with the substantially circular path to provide an unobstructed path about the liquid container filling and handling machine.

18. The cleaning apparatus according to claim 17, wherein each beverage container handling unit comprises a beverage container receiving portion for receiving beverage containers, and further wherein:

said washing container means comprise washing containers, and said washing containers each comprise:

a first container-shaped portion for containing the cleaning substance therein; and a second portion, said second portion comprising said connecting means for connecting the container-shape portion to the beverage container handling units, said connecting means being movable with respect to the container-shaped portion between a release and a connecting position to release and connect said connecting means with the beverage container handling units;

said container feed means comprises means for moving the connecting means with respect to the container-shaped portion to release and connect said washing containers to the beverage container handling units;

said container-shaped portion of said washing containers comprises a substantially cylindrical member having a containment area for containing the cleaning substance therein;

said containment area defines a first end of the container-shaped portion;

said connecting means comprises a sleeve-shaped member disposed concentrically about the containment area, said sleeve-shaped member having a first end for engaging with the container receiving portion of the beverage container handling units, and a portion for engaging with said containment area to hold said containment area to the container receiving portion of the beverage container handling units;

said sleeve-shaped member being movable between the connecting position with the first end of said sleeve-shaped member extending beyond the first end of said container-shaped portion, and the release position with the first end of said sleeve-shaped member disposed at least adjacent but not beyond said first end of the container shaped portion;

said sleeve-shaped member has a second end opposite the first end, the second end comprising slot means for being engaged by said means for moving the connecting means;

said means for moving the connecting means comprises:

at least one engagement finger for engaging in said slot means to extend and retract the first end of said sleeve-shaped member with respect to the first end of said container-shaped portion; and means for moving said at least one engagement finger to move said sleeve-shaped member.

19. The cleaning apparatus according to claim 18 wherein each of said plurality of washing container means comprises connecting means for being connected with a corresponding beverage container handling unit for connecting each of said washing container means to its corresponding beverage container handling unit for movement of the connected washing container means about the substantially circular path along with its corresponding beverage container handling unit.

20. The cleaning apparatus according to claim 19 wherein said containment area for containing the cleaning substance therein, comprises a bowl-shaped containment area.

* * * * *

UNITED STATES PATENT AND TRADEMARK OFFICE

CERTIFICATE OF CORRECTION

PATENT NO. : 5,558,138

DATED : September 24, 1996

INVENTOR(S) : Klaus-Friedrich STOCK and Siegmar SINDERMANN

It is certified that error appears in the above-indentified patent and that said Letters Patent is hereby corrected as shown below:

In column 5, line 49, after 'through', delete " 4''," and insert --5'',--.

In column 6, line 47, after 'spring', delete " 24'''," and insert --25''',--.

In column 7, line 4, after 'is', delete "open with" and insert --open. With--.

In column 7, line 21, after 'pipe', delete " 14'''," and insert --15'''--.

In column 8, line 58, after 'pipe', delete " 154''' " and insert --15'''--.

In column 12, line 19, after 'the', delete "filling-valve" and insert --filling valve--.

In column 12, line 25, after the first occurrence of "U.S.", delete "Patent:" and insert --Patents:--.

UNITED STATES PATENT AND TRADEMARK OFFICE

CERTIFICATE OF CORRECTION

PATENT NO. : 5,558,138

DATED : September 24, 1996

INVENTOR(S) : Klaus-Friedrich STOCK and Siegmar SINDERMANN

It is certified that error appears in the above-indentified patent and that said Letters Patent is hereby corrected as shown below:

In column 12, line 64, after 'following' delete the first occurrence of "U.S.".

In column 19, line 55, Claim 17, after 'supply', delete "station;" and insert --station, and feeding the--.

Signed and Sealed this

Eighteenth Day of February, 1997

Attest:

BRUCE LEHMAN

Attesting Officer

Commissioner of Patents and Trademarks